G. A. WOOD.
PROCESS OF MAKING TOOL SHANKS AND HANDLES.
APPLICATION FILED AUG. 11, 1915.
1,198,609.                                          Patented Sept. 19, 1916.
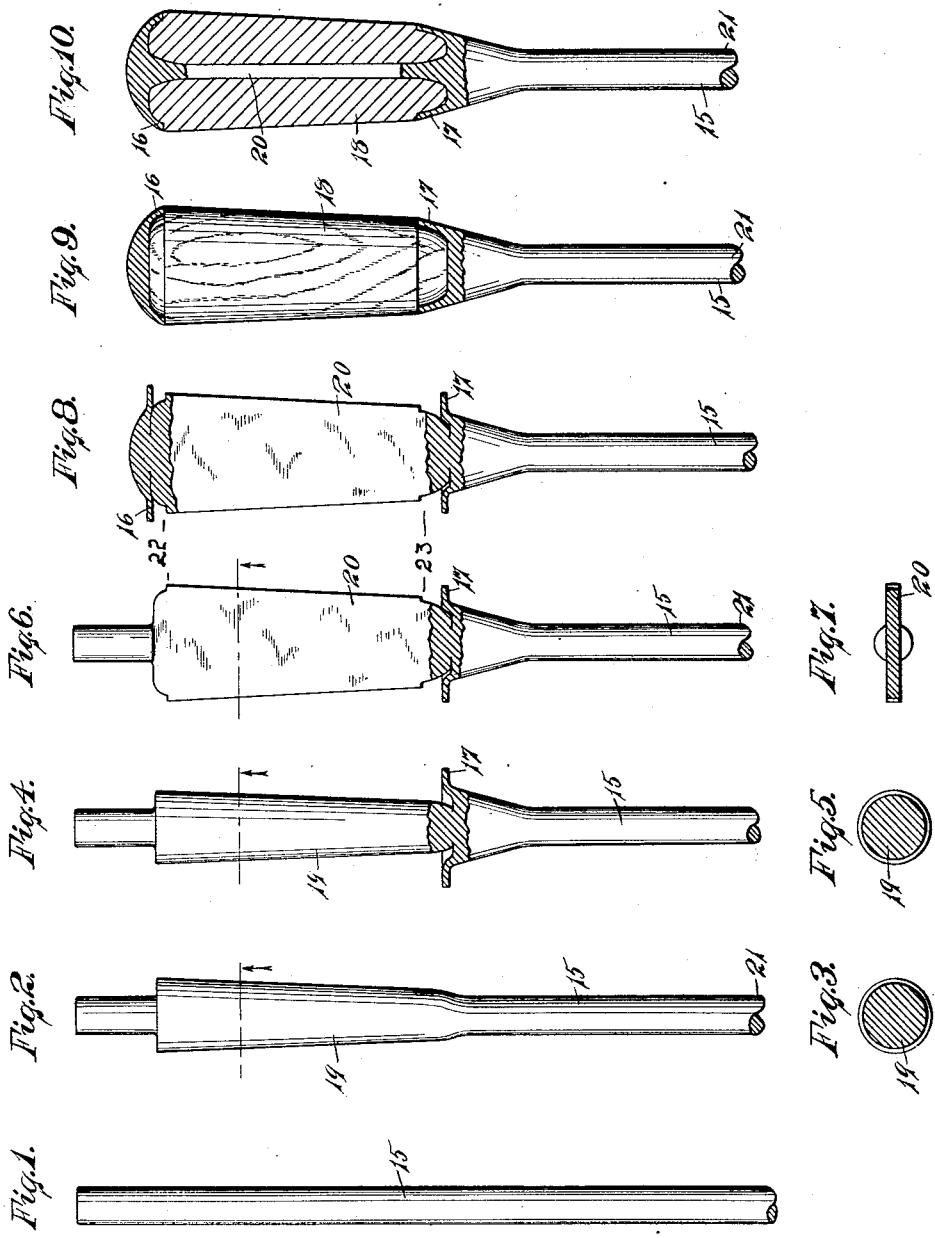

UNITED STATES PATENT OFFICE.

GEORGE A. WOOD, OF SOUTHINGTON, CONNECTICUT.

PROCESS OF MAKING TOOL SHANKS AND HANDLES.

1,198,609.  Specification of Letters Patent.  Patented Sept. 19, 1916.

Application filed August 11, 1915. Serial No. 44,891.

*To all whom it may concern:*

Be it known that I, GEORGE A. WOOD, a citizen of the United States, and a resident of Southington, in the county of Hartford and State of Connecticut, have invented a new and Improved Process of Making Tool Shanks and Handles, of which the following is a specification.

My invention relates more especially to that class of tools, of which a screw driver is an example, composed of metal and having a handle of some different material, as wood, affixed thereto, and an object of my invention, among others, is to provide a tool having improved means for securing the handle in place in a manner to secure a peculiarly attractive tool.

One form of tool embodying my invention and in the construction and use of which the objects herein set out, as well as others, may be attained, is illustrated in the accompanying drawings, in which—

Figure 1 is a view of a piece of metal from which the tool is to be formed. Fig. 2 is a view of a portion of the tool partially formed. Fig. 3 is a view in cross section through the same. Fig. 4 is a view similar to Fig. 3 showing the shape of the tool shank in an advanced step in its formation. Fig. 5 is a view in cross section through the same. Fig. 6 is another view similar to Fig. 3 showing the shape of the tool shank in a still further advanced step in its formation. Fig. 7 is a view in cross section through the same. Fig. 8 is still another view similar to Fig. 3 showing the shape of the shank ready for the application of the handle. Fig. 9 is a view showing the handle applied, a portion of the metallic parts being cut in central longitudinal section; and Fig. 10 is a similar view but as viewed from a point at right angles to the point of view of Fig. 9.

My invention contemplates a handle shank having a lip or flange at each end to encircle or envelop the ends of the handle to securely retain it in place, and while it is particularly applicable for securing a handle composed of a plural number of pieces it is not limited to a tool having such a handle.

In the accompanying drawings the numeral 15 indicates a piece or rod of metal preferably of cylindrical form and from which the tool as a whole is to be made. This piece of metal is, by a series of operations, formed with a flange 16 at that end constituting the outer end of the shank and a flange 17 is formed at the opposite end of the shank. A handle 18 of wood or other suitable material is placed upon the shank and the flanges 16 and 17 are bent over to inclose or envelop the opposite ends of the handle and secure it firmly in place. In the preferred form of construction the handle is formed of two pieces of material applied to the shank from opposite sides thereof.

I have found that my improved tool may be constructed as illustrated in the accompanying drawings in which the piece or rod 15 is upset near one end to form a tapered portion 19 at the lower end of which a flange 17 is then made and outturned, as shown in Fig. 4 of the drawings. In this operation a short length 21 of round form is left at the outer end of the shank. The portion 19 is now flattened as shown in Fig. 7 forming the shank 20 and also shoulders 22 at opposite edges of the flattened portion near the outer end of the handle, as well as shoulders 23 also at opposite edges of the flattened portion and near the other end of the handle, and the flange 16 is now formed at the outer end of the shank as shown in Fig. 8 and the handle 18 is then applied as hereinbefore described.

It will be understood that the part 21 may be formed into any suitable shape, as for a screw driver blade, chisel, or other suitable tool.

It will be further understood that the shank may be of any desired shape, and other details of construction may be changed without departing from the spirit and intent of the invention.

I claim—

1. The process of making a tool handle that consists in forming a round flange at each end of a flat shank, that at the outer end being formed by heading over the end of the shank, then applying handle parts to opposite sides of the shank between said heads, and then bending the flanges to envelop and inclose the ends of the handle parts.

2. The process of making a tool handle that consists in providing a flat portion of a shank between its ends, leaving a round part at the outer end of the shank, heading over said round part to provide a flange, applying handle parts to opposite sides of the shank, and bending said flange to envelop and inclose the ends of the handle parts.

3. The process of making a tool handle that consists in upsetting a portion of a rod of stock of substantially uniform diameter to comprise a handle shank, next flattening said shank leaving shoulders at one end and on opposite sides thereof, next forming a flange at an end of the shank of a size to fit within the boundaries of said shoulders, then applying handle parts to opposite sides of the shank, and then bending the flanges down to envelop and inclose the handle parts and within the boundaries of said shoulders.

4. The process of making a tool handle that consists in upsetting a portion of a rod of stock of substantially uniform diameter leaving a short length at one end undisturbed, next forming a flange at each end of the shank, one of the flanges being formed from said short length, then applying handle parts to opposite sides of the shank, and then bending the flanges to envelop and inclose the ends of the handle.

5. The process of making a tool handle that consists in upsetting a portion of a rod of stock of substantially uniform diameter leaving a short length at one end, next flattening said upset part to provide a handle shank and forming flanges at opposite ends of the shank, one of said flanges being formed from said short length, then applying handle parts to opposite sides of the shank, and then bending the flanges over to inclose the ends of the handle.

6. The process of making a tool handle that consists in upsetting a portion of a rod of stock of substantially uniform diameter leaving a short length at one end, next flattening said upset portion and providing shoulders at opposite sides on one end, next forming flanges at opposite ends of the shank, one of said flanges being formed from said short length, then applying handle parts to opposite sides of the shank, and then bending said flanges to inclose the handle, one of said flanges being bent to lie within the boundaries of said shoulders.

7. The process of making a tool handle that consists in forming a flange at each end of a flat shank, that at the outer end being formed by heading over the end of the shank and then applying handle parts to opposite sides of the shank between said heads, and then bending the flanges to envelop and inclose the ends of the handle parts.

GEORGE A. WOOD.

Witnesses:
ARTHUR B. JENKINS,
E. F. EATON.

Copies of this patent may be obtained for five cents each, by addressing the "Commissioner of Patents, Washington, D. C."